W. C. TUCKER,

Assignor to IVES & MILLER.

Wagon-Hub.

No. 8,719. Reissued May 20, 1879.

Witnesses.

J. H. Shumway

~~D. Cattin.~~

Welcome C. Tucker

Inventor

By atty.

Wm. Earle

N. PETERS, PHOTO-LITHOGRAPHER, WASHINGTON, D. C.

UNITED STATES PATENT OFFICE.

WELCOME C. TUCKER, OF RICHMOND SWITCH, RHODE ISLAND, ASSIGNOR TO IVES & MILLER, OF NEW HAVEN, CONNECTICUT.

IMPROVEMENT IN WAGON-HUBS.

Specification forming part of Letters Patent No. 68,808, dated September 10, 1867; Reissue No. 8,719, dated May 20, 1879; application filed July 26, 1878.

*To all whom it may concern:*

Be it known that I, WELCOME C. TUCKER, of Richmond Switch, in the county of Washington and State of Rhode Island, have invented a new Improvement in Wagon-Hubs; and I do hereby declare the following, when taken in connection with the accompanying drawings and the letters of reference marked thereon, to be a full, clear, and exact description of the same, and which said drawings constitute part of this specification, and represent, in—

Figure 1:
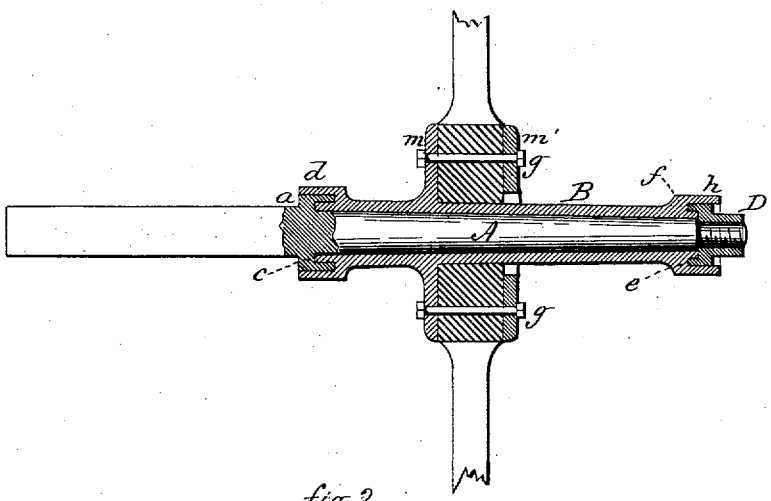
Figure 2:
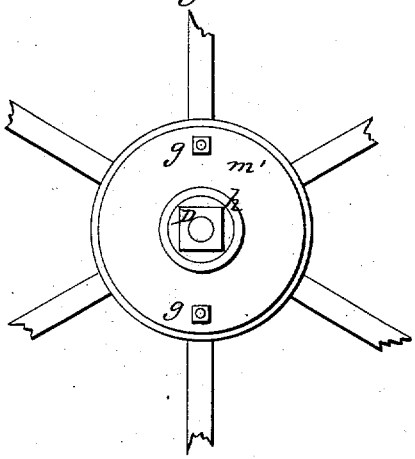

Figure 1, longitudinal central section; Fig. 2, end view.

This invention relates to an improvement in the construction of wagon-wheels, the object being to retain the oil on the axle-arm and exclude dust and dirt therefrom; and it consists in the construction and combination, as hereinafter described, and more particularly recited in the claims.

A is the axle-arm, of usual form; and B, the box, fitting the said arm, so as to revolve freely thereon, the said arm forming the bearing on which the wheel revolves. At the inner end of the axle-arm a shoulder, *c*, is made, to form a stop or bearing, to prevent lateral movement of the wheel on the axle. From this shoulder a flange, *a*, extends forward parallel with and concentric to the axle-arm, leaving a space between the flange and the axle-arm.

In the rear end of the box a concentric recess is formed to receive the flange *a*, and at the rear end of the box a flange, *d*, is formed, extending rearward over the flange *a*, this flange *d* forming one side of the recess at the end of the box.

At the outer end of the axle-arm a thread is cut, and a nut, D, applied in the usual manner. This nut is constructed with a flange, *e*, concentric to the axle, projecting inward over the end *f* of the box, and the box constructed with a concentric flange, *h*, extending over the nut and forming a recess for the flange *e* on the nut.

As a support for the spokes a collar, *m*, is made as a part of the box, and outside this is a second collar, *m'*, adjustable relatively to the fixed collar, and between these the wood portion of the wheel is introduced and secured by screw-bolts *g g*, as shown.

I am aware that axles have been constructed with a cup-shaped flange, and the box so as to extend beneath the said cup-shaped flange; but I am not aware that axle-boxes have been constructed with a cup-shaped flange to inclose the said cup-shaped flange on the axle, as herein described.

I claim—

1. The axle-arm, on which the wheel takes its bearing, with the shoulder at its inner end, and the flange projecting forward from the shoulder parallel with and concentric to the arm, all made as a part of the axle, combined with the box fitting said arm and constructed to enter beneath said flange, and with a concentric recess corresponding to and so as to inclose said flange at the shoulder of the axle-arm, substantially as described.

2. The combination of the box constructed with a cup-shaped flange at the outer and inner ends, the axle with a cup-shaped flange at the shoulder, and so as to be inclosed by the cup-shaped flange on the box, the nut constructed with a cup-shaped flange, the corresponding cup-shaped flange on the box inclosing the flange of the nut, a stationary collar, *m*, and adjustable collar *m'*, and so as to inclose the wood center of the wheel, substantially as described.

WELCOME C. TUCKER.

Witnesses:

JOHN E. EARLE,

H. A. KITSON.